A. HUETTER.
EXPANSIBLE CORE FOR CURING TIRES.
APPLICATION FILED APR. 15, 1920.
1,365,104.
Patented Jan. 11, 1921.
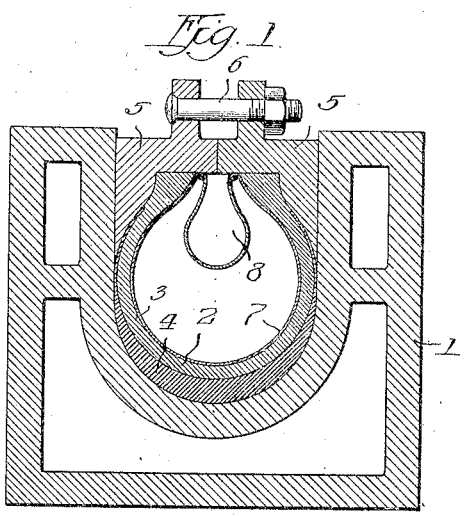
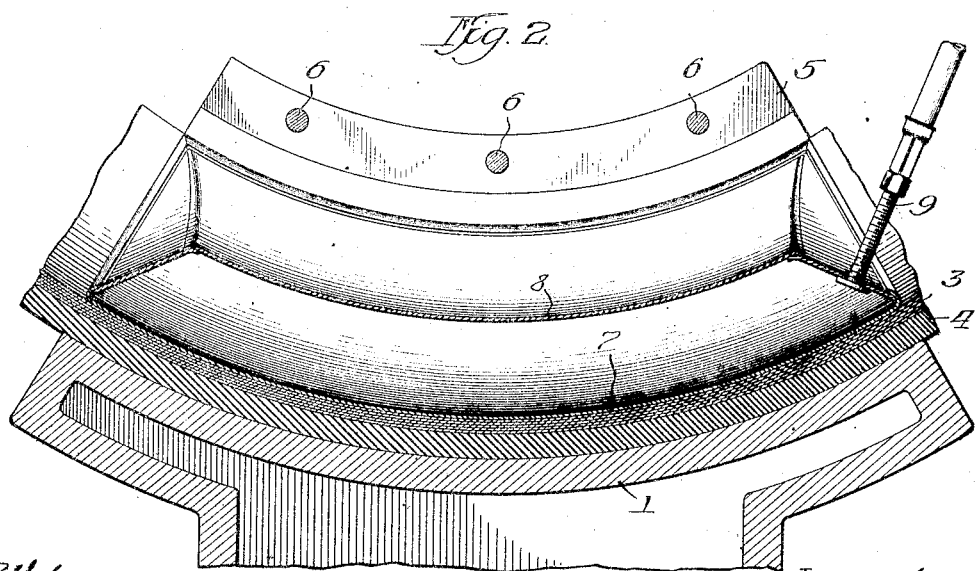

UNITED STATES PATENT OFFICE.

ANDREW HUETTER, OF DAYTON, OHIO, ASSIGNOR TO THE FIRESTONE TIRE AND RUBBER COMPANY, OF AKRON, OHIO, A CORPORATION OF OHIO.

EXPANSIBLE CORE FOR CURING TIRES.

1,365,104.    Specification of Letters Patent.    Patented Jan. 11, 1921.

Application filed April 15, 1920. Serial No. 373,992.

*To all whom it may concern:*

Be it known that I, ANDREW HUETTER, citizen of Austria, residing at Dayton, in the county of Montgomery, State of Ohio, have invented certain new and useful Improvements in Expansible Cores for Curing Tires, of which the following is a specification.

This invention relates to an apparatus for use in vulcanizing pneumatic tires, and is designed to replace the customary fabric and rubber expansible bag. The type of apparatus here shown is a metallic flexible and expansible bag which will perform the functions of the expansible bag composed of layers of fabric and rubber now used for this purpose and will be more desirable and less expensive to manufacture.

These and other objects are apparent from an examination of the invention and it will be evident that changes and modifications may be made without sacrificing any of the benefits of the invention.

In the drawings:

Figure 1 is a cross section through a tire repairing mold showing the core or bag in place.

Fig. 2 is a longitudinal section.

In the drawings 1 represents the vulcanizing mold or cavity such as is customarily used in tire repair shops or factories. 2 is the tire casing, the carcass being shown at 3 and the tread at 4. A pair of bead molding or forming rings is shown at 5 being shaped on their inner edges to conform to the lower outer edges of the casing and being held together by bolts 6.

The air bag or expansible core is shown at 7 and is made of flexible sheet of any desirable material. It has been found that sheet copper is suitable for this purpose, although other materials may be found. The outer surface of the core is made to conform approximately to the inner surface of the tire casing. At its inner edge between the beads the bag is formed with a reëntrant portion or recess 8 which is curved inwardly making the bag in somewhat horseshoe form. At one end of the core or bag is provided an inflating device, indicated by the numeral 9, which is designed to be attached to any suitable source of fluid pressure.

In using the improved sectional core or air bag the parts are assembled in the relation shown in the drawings and the pressure is applied to the interior of the core, whereby it is expanded forcing the tire casing in contact with the walls of the mold, the expansion being permitted by the recess or reëntrant portion 8.

The air bag or expansible core is superior to those in use at the present time as, owing to its metallic construction it is not easily damaged. The core is expansible in a similar fashion to the rubber and fabric air bag and performs all the functions of the old style bag. While the construction is shown as applied only to a sectional air bag, such as used in the repair of tire casings, it is obvious that a similar construction may be used for a complete core, such as used in the manufacture of tires.

Other changes and modifications may be made in the form of construction, the broad invention lying in the construction of an expansible metallic shell, which may be expanded by fluid pressure, the formation of the reëntrant portion of the bag permitting the shell to expand. Such variations in details of construction as are obvious to those familiar with the art are intended to be covered herein and are within the scope of these appended claims.

I claim:

1. A vulcanizing core comprising a metallic shell with means to expand the shell by fluid pressure.

2. A vulcanizing core comprising a metallic shell formed with flexible walls having means to permit the expansion of the shell, and means to introduce fluid pressure within the shell.

3. A vulcanizing core comprising a shell having flexible metallic walls, a reëntrant formation in one of said walls and means to introduce fluid pressure within the shell.

4. A vulcanizing core comprising a thin wall of substantially even thickness throughout, the outer surface of the wall conforming to the shape of the inside of a tire casing and a reëntrant formation at the beads of the tire permitting expansion of the core.

5. A vulcanizing core comprising a shell, the walls whereof are flexible but inextensible, a formation within one of said walls permitting the shell to expand and means communicating with the interior of the shell to expand the same by fluid pressure.

6. A vulcanizing core comprising the walls whereof are flexible but inextensible, a portion of said walls being shaped to conform to the inner surface of a tire casing, a reëntrant formation between the beads, and means connected with the shell to expand it.

7. A vulcanizing core comprising a shell, the walls whereof are flexible but inextensible, a portion of said walls being shaped to conform to the inner surface of a tire casing, a reëntrant formation between the beads, and means connected with the shell to expand it by fluid pressure.

ANDREW HUETTER.